(12) United States Patent
Brassow et al.

(10) Patent No.: US 7,406,473 B1
(45) Date of Patent: Jul. 29, 2008

(54) DISTRIBUTED FILE SYSTEM USING DISK SERVERS, LOCK SERVERS AND FILE SERVERS

(75) Inventors: Jonathan Brassow, St. Paul, MN (US); Michael J. Declerck, El Cerrito, CA (US); Andrew Lewis, Roseville, MN (US); Adam Manthei, Spring Lake, MN (US); Matthew O'Keefe, Plymouth, MN (US); Kenneth Preslan, Minneapolis, MN (US); David Teigland, Eagan, MN (US)

(73) Assignee: Red Hat, Inc., Raleigh, NC (US)

( * ) Notice: Subject to any disclaimer, the term of this patent is extended or adjusted under 35 U.S.C. 154(b) by 12 days.

(21) Appl. No.: 10/355,786

(22) Filed: Jan. 30, 2003

Related U.S. Application Data

(60) Provisional application No. 60/352,822, filed on Jan. 30, 2002.

(51) Int. Cl.
*G06F 12/00* (2006.01)
*G06F 13/16* (2006.01)

(52) U.S. Cl. .............................. 707/10; 707/8; 711/114; 711/4; 711/147; 711/163

(58) Field of Classification Search ................. 711/150; 707/8, 10, 201; 709/203
See application file for complete search history.

(56) References Cited

U.S. PATENT DOCUMENTS 6,173,293 B1    1/2001  Thekkath et al.
6,185,601 B1 *  2/2001  Wolff .......................... 709/203
6,493,804 B1   12/2002  Soltis et al.
2002/0019908 A1 * 2/2002  Reuter et al. ................. 711/112
2002/0147719 A1 * 10/2002 Zhang et al. ................... 707/9

OTHER PUBLICATIONS

Steven R. Soltis, Thomas M. Ruwart, et al., *The Global File System*, Proceedings of the Fifth NASA Goddard Conference on Mass Storage Systems (1996).
Kenneth W. Preslan, Andrew P. Barry et al., *A 64-bit, Shared Disk File System for Linux*, Sixteenth IEEE Mass Storage Systems Symposium held jointly with the Seventh NASA Goddard Conference on Mass Storage Systems & Technologies, San Diego, California (Mar. 15-18, 1999).

* cited by examiner

*Primary Examiner*—B. James Peikari
(74) *Attorney, Agent, or Firm*—MH2 Technology Law Group LLP

(57) ABSTRACT

A distributed file system is disclosed. A plurality of disk servers, operating as a single distributed disk server layer, are connected to the one or more physical disks. Each disk server stores meta-data for each of the files. A plurality of lock servers, having one or more locks for each file operates as a single distributed lock server to coordinate access to the files stored by the disk server layer. A plurality of asynchronous file servers, operating as a single distributed file server layer in response to a request for a file from a user program: (i) retrieves the requested file from the disk server layer and at least one lock, associated with the retrieved file, from the lock server, and (ii) retrieves meta-data for at least one file that is related to the requested files, and at least one lock, for each file that has had its meta-data retrieved.

6 Claims, 8 Drawing Sheets

GUI

GFS_BIG=45.5 GBYTES

■ GFS     ▨ ReiserFS     □ Unassigned

▩ Ext2FS     ◪ Unknown     ✻=DMEP enable

■ Fat     ▨ Swap

DISTRIBUTED FILE SYSTEM USING DISK SERVERS, LOCK SERVERS AND FILE SERVERS

CROSS REFERENCE TO RELATED APPLICATION

This application claims priority from U.S. Provisional application Ser. No. 60/352,822, filed Jan. 30, 2002.

FIELD OF THE INVENTION

This invention relates generally to computer file storage systems, and more particularly to a file storage system distributed over multiple computer systems.

BACKGROUND OF THE INVENTION

In modern computer systems, large collections of data are usually organized on storage disks as files. If a large number of files exist they may be distributed over multiple disks and/or computer systems. A file system is used to control access to the files by communicating with the various disk drives. Computer programs access the files by requesting file services from one or more file systems. Some file systems also assist with error recovery functions. In most file systems, the files contain user data and metadata. Metadata is information required to manage the user data, such as names, locations, dates, file sizes, access protection, and so forth. The organization of the user data is usually managed by the client programs.

Administering a large distributed file system that serves a large number of users is a complex task. To store a larger number of files, additional disks and servers must be added. To simplify the organization of files, groups of files or "volumes" are often manually assigned to particular disks. Then, the files can by manually moved or replicated when components fill up, fail, or become throughput bound.

Joining many thousands of files distributed over many disks into a redundant array of independent disks (RAID) is one solution. Nevertheless, administration problems still arise when the system grows so large to require multiple RAIDs, and multiple server processors.

One such distributed files system has been developed by Sistina Software, Inc. and is called the Global File System (GFS). This system has been described in a number of publications including: "The Global File System" Proceedings of the Fifth NASA Goddard Conference on Mass Storage Systems by Steven R. Soltis, Thomas M. Ruwart, et al. (1996); and "A 64-bit, Shared Disk File System for Linux" Sixteenth IEEE Mass Storage Systems Symposium held jointly with the Seventh NASA Goddard Conference on Mass Storage Systems & Technologies, Mar. 15-18, 1999, San Diego, Calif. by Kenneth W. Preslan, Andrew P. Barry et. al. hereby incorporated by reference.

The Global File System (GFS) is a shared storage device, cluster file system. GFS supports multi-client reads and writes to the file system, journaling of the reads and writes, and rapid recovery from client failures. Nodes within a GFS cluster physically share the same storage by means of Fibre Channel (FC), shared SCSI devices, or network block devices. The file system is configured so that it appears to reside on each node and will synchronize a file access across the cluster. GFS is fully symmetric. In other words, all nodes are equal and there is no server which could be either a bottleneck or a single point of failure. GFS uses read and write caching while maintaining full file system semantics.

Other distributed files systems are know to those skilled in the art. For example, U.S. Pat. No. 6,173,293 issued Jan. 9, 2001 to Thekkath et al., herein incorporated by reference, discloses a file system that is distributed over a plurality of computers connected to each other by a network. The plurality of computers execute user programs, and the user programs access files stored on a plurality of physical disks connected to the plurality of computers. The file system includes a plurality of file servers executing on the plurality of computers as a single distributed file server layer. In addition, the file system includes a plurality of disk servers executing on the plurality of computers as a single distributed disk server layer, and a plurality of lock servers executing on the plurality of computers as a single distributed lock server to coordinate the operation of the distributed file and disk server layers so that the user programs can coherently access the files on the plurality of physical disks. The plurality of file servers executes independently on a different one of the plurality of computers, and the plurality of file servers communicate only with plurality of disk servers and the plurality of lock servers, and not with each other. Furthermore, the disk server layer organizes the plurality of physical disks as a single virtual disk having a single address space for the files.

SUMMARY OF THE INVENTION

The present invention discloses a file system that is distributed over a plurality of computers that are connected by a network. The plurality of computers execute user programs. The user programs access files stored on one or more physical disks connected to the plurality of computers. A plurality of disk servers, operating as a single distributed disk server layer, are connected to the one or more physical disks. Each disk server stores meta-data for each of the files stored on the one or more disks. A plurality of lock servers, having at least one or more read locks and one or more write locks for each file stored on the one or more physical disks, operates as a single distributed lock server to coordinate access to the files stored by the disk server layer. A plurality of asynchronous file servers, each having a memory, operating as a single distributed file server layer so that in response to a request for a file from a user program, the file system: (i) retrieves the requested file from the disk server layer and at least one lock, associated with the retrieved file, from the lock server, and (ii) retrieves meta-data for at least one file that is related to the requested files, and at least one lock, for each file that has had its meta-data retrieved, the at least one lock and meta-data being temporarily stored in the file server memory.

In the preferred embodiment the distributed file system is managed as a single system with a single point of control using a shared system image. The infrastructure may be managed from both a standard command line interface (which allows for scripting) as well as a sophisticated GUI management framework.

DETAILED DESCRIPTION OF THE PREFERRED EMBODIMENTS

Figure 1:
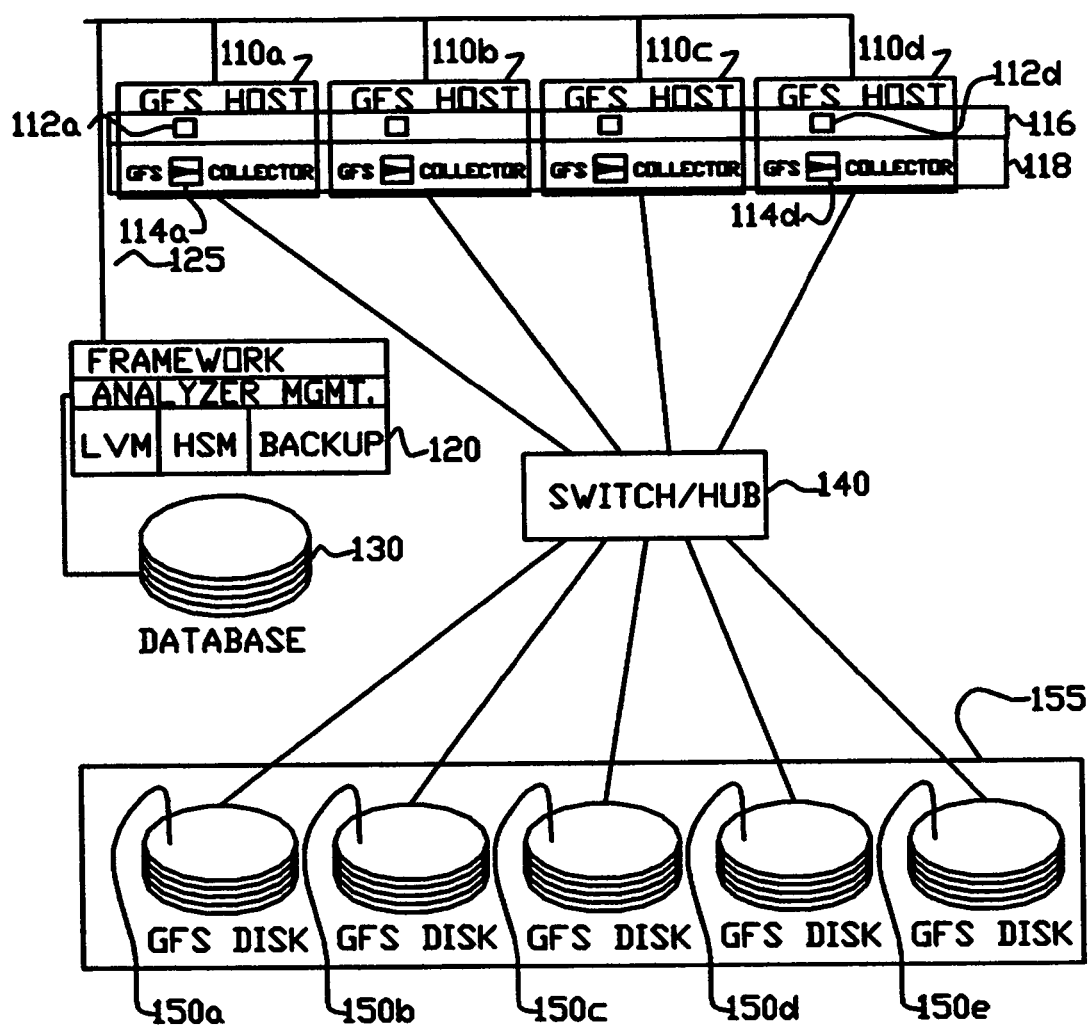
FIG. 1 is a block diagram of a file system constructed in accordance with the present invention.

FIG. 1 is a block diagram of a distributed file system 100 constructed in accordance with the present invention. It is comprised of a plurality of hosts 110, a management node 120 which is connected to a database 130. Each host 110 preferably communicates with management node 120, via a network 125, and at least one switch 140. Switch 140 is connected to one or more disk servers 150. In the preferred embodiment, host 110 is a general purpose computer. Those skilled in the art will recognize that switch 140 could be replaced with a hub or a router.

In the preferred embodiment, disk servers 150 are connected to the one or more physical disks (not shown) and operate as a single distributed disk server layer 155 having a single address space. Each disk server 150 also stores meta-data, that is summary information about the file, for each of the files stored in the disk server layer 155. The meta-data is preferably created and updated when the file is written to one of the disk servers 150.

In the preferred embodiment, each host 110 is a general purpose computer, having a memory, that executes a file server 112 and a lock server 114. Each lock server 112 has at least one or more read locks and one or more write locks for each file stored in the disk server layer 155. The plurality of lock servers 114 operate as a single distributed lock server 118 to coordinate access to the files stored by the disk server layer 155.

Each host 110 coordinates its efforts such that the files servers 114 operate as a single distributed file server layer 116 and the lock servers operate as a single distributed lock server 118 so that in response to a request, from a user program executing on host 110, for a file stored a physical disk associated with a disk server layer 155, the file server 112, on host 110, receiving the request from the user program: (i) retrieves the requested file from the disk server layer 155 and at least one lock, associated with the retrieved file, from the lock server 118, and (ii) retrieves meta-data for at least one file that is related to the requested files, and at least one lock, for each file that has had its meta-data retrieved. The retrieved lock and meta-data are preferably stored in the memory of each host 110.

In the preferred embodiment, management node 120 allows distributed file system 100 to be managed as a single system with a single point of control using a shared system image. The infrastructure may be managed from management node 120 from either a standard command line interface (which allows for scripting) as well as a sophisticated Graphical User Interface (GUI) management framework. The management framework allows information to be plugged into network management software based upon standards like SNMP, including Tivoli, CA Unicenter, and user interfaces provided by other vendors.

Providing a GUI interface allows less experienced system administrators to efficiently work with the file system 100 of the present invention. In addition, in the preferred embodiment, the GUI tools generate scripts based upon a sequence of GUI commands, which can be re-used by the users to instantiate multiple storage cluster installations.

In the preferred embodiment, the GUI interface of management node 120 integrates all major pieces of storage clustering management—cluster file system, volume manager, and backup—into a single, tightly-integrated framework. Of course, those skilled in the art will recognize that a standalone GUI interface can be optimized for particular applications, including NAS clusters (based on the NFS and CIFS protocol), web server clusters (based on ftp and http), and email server clusters.

In addition, management node 120 allows reconfigurations of distributed file system 100 (such as kernel upgrades, adding or deleting new storage devices and volumes, and re-sizing of the cluster file system) can be quickly and easily accomplished while file system 100 is in use. Management node 120 is also designed to allow the integration of cluster volumes on- and off-line, and to integrate these new volumes into existing cluster file systems.

Management node 120 also provides functionality that allows rolling upgrades of the OS kernel of host 110 and disk servers 150 to be performed. Thus, making it possible to add servers, storage, and network units independently while the system is operational and on-line.

File system 100 will survive and transparently route around faults in the servers, HBAs, storage area network, and disk arrays. Multi-pathing through multiple HBA paths and switch routes, as well as array controller fail-over is supported. Fail-over of server applications (services like email, NFS, CIFS, http, ftp, databases, etc.) can be transparently used without interrupting the current operation of the system.

The present invention allows application load balancing across servers and storage devices in an intrinsic and transparent manner. Server application load balancing (services like email, NFS, CIFS, http, ftp, databases, etc.) is also an intrinsic and transparent part of the system.

The present invention allows a completely integrated solution (cluster file system, cluster volume manager, and clustered backup), yet components of the system are interoperable with other cluster and storage system software and hardware. The components are modular so that different components can be used independently (i.e., it is not be monolithic, but the well-integrated components).

File system 100 supports fast, efficient LAN-free backups. Parallel backups and snapshots are supported to increase performance and reduce the overall time required for backups of large systems. Backups support clean recovery and re-start of the backup process when servers or tapes fail during backup or recovery: such backups will be referred to as clustered backups. In addition, a dump and restore capability is provided for improved performance and accuracy of the system backup. Backups can also be executed across parallel servers in the cluster to improve performance, thus allowing an integrated cluster file system, volume manager, and backup platform. Snapshots at both the file system and volume manager level are also provided, so that backups and restores can proceed simultaneously with the regular system workload.

The storage systems software are independent of the storage networking hardware. The present invention operates on a variety of storage are networks including Fibre Channel, Infiniband, or IP-based storage area networks.

Files system 100, and in particular management node 120, also provides virtualization. Virtualization is an important storage area networking technology that allows physical consolidation of storage across an enterprise.

Extended attributes are also provided. These allow file system 100 to tag files and directories with metadata related to access privileges, file usage and modification, allowed services, and other storage-cluster-relevant information. By integrating these extended attributes with LDAP, an enterprise-wide, open directory service, a comprehensive, powerful storage management tool is created.

File system 100 provides: monitoring, alerting, and reporting on the storage infrastructure (devices, switches, HBAs, and servers); precise information on storage utilization across the enterprise for capacity planning and cost accounting for storage usage; and data analysis and decision support to enable best practices in storage management.

Additional details concerning the various implementations of the present invention are also described in U.S. provisional application Ser. No. 60/352,822, filed Jan. 20, 2002 herein, incorporated, in its entirety, by reference.

Management node 120 utilizes a software framework that accepts add-on modules and/or plugins to provide additional functionality to the base framework. The software framework will automatically handle the presentation and organization of the information presented by the modules/plugins and provide a consistent user interface (UI).

Management node 120 performs operations like creating windows, pop-up dialogs, selection lists, menus, etc via a defined API. Inheritance of base functionality and look/feel of modules are extensively used to keep from replicating work (to include creation, testing, and verification). The software elements of management node 120 act together to present an integrated application/environment to the user. Additional functionality is provided via plug-ins (flash, shockwave, encryption, pdf, audio, video, etc).

Management node 120 provides a number of functions including: adherence to appropriate UI standards; a unified API for creating GUI objects; adherence to industry standards for gathering device specific information (SNMP, SLP [service location protocol], CIM) when appropriate and feasible; a unified and extendable API for inputting product information in to the framework; a unified and extendible API for instantiating control and query actions against integrated third-party products; the ability to "script" sequences of operations in the appropriate management and performance modules (i.e. Install, Performance). In addition the modules shall be capable of executing as standalone programs.

File system 100 uses helper libraries (libGFS, libLVM, etc. . . . ) that provide a clean set of APIs between various products. This prevents the unnecessary coupling of these products to each other thereby allowing changes to take place in either set with out adversely affecting the other. Helper libraries are and modules are also used that utilize storage cluster security mechanisms when appropriate for execution of privileged commands or collecting privileged information on either local or remote storage cluster nodes.

The present invention also uses a framework and associated modules that utilize LDAP whenever possible for storing, querying, and/or manipulating information. In scenarios where this is not possible (i.e. application and/or function can not utilize LDAP functionality) the information shall be stored in an appropriate manner for the application/module and in the LDAP database as well. This provides a single point for querying information, as well as, a mechanism for recovering corrupted/lost data.

In an alternate embodiment, the present invention may use either a framework and associated modules capable of: utilizing remote database instances via standardized methods (i.e JDBC); secure control mechanisms to instantiate changes upon either a single node or multiple nodes within the storage cluster, via mechanisms like "ssh" and "gsh—the old, perl global shell" or "cfengine"; or a frame work that requires a common reference clock. In the preferred embodiment, all nodes shall run "ntp" with the same master server. The master server may be one of the nodes in the storage cluster as long as all other nodes are "peers"

Figure 2:
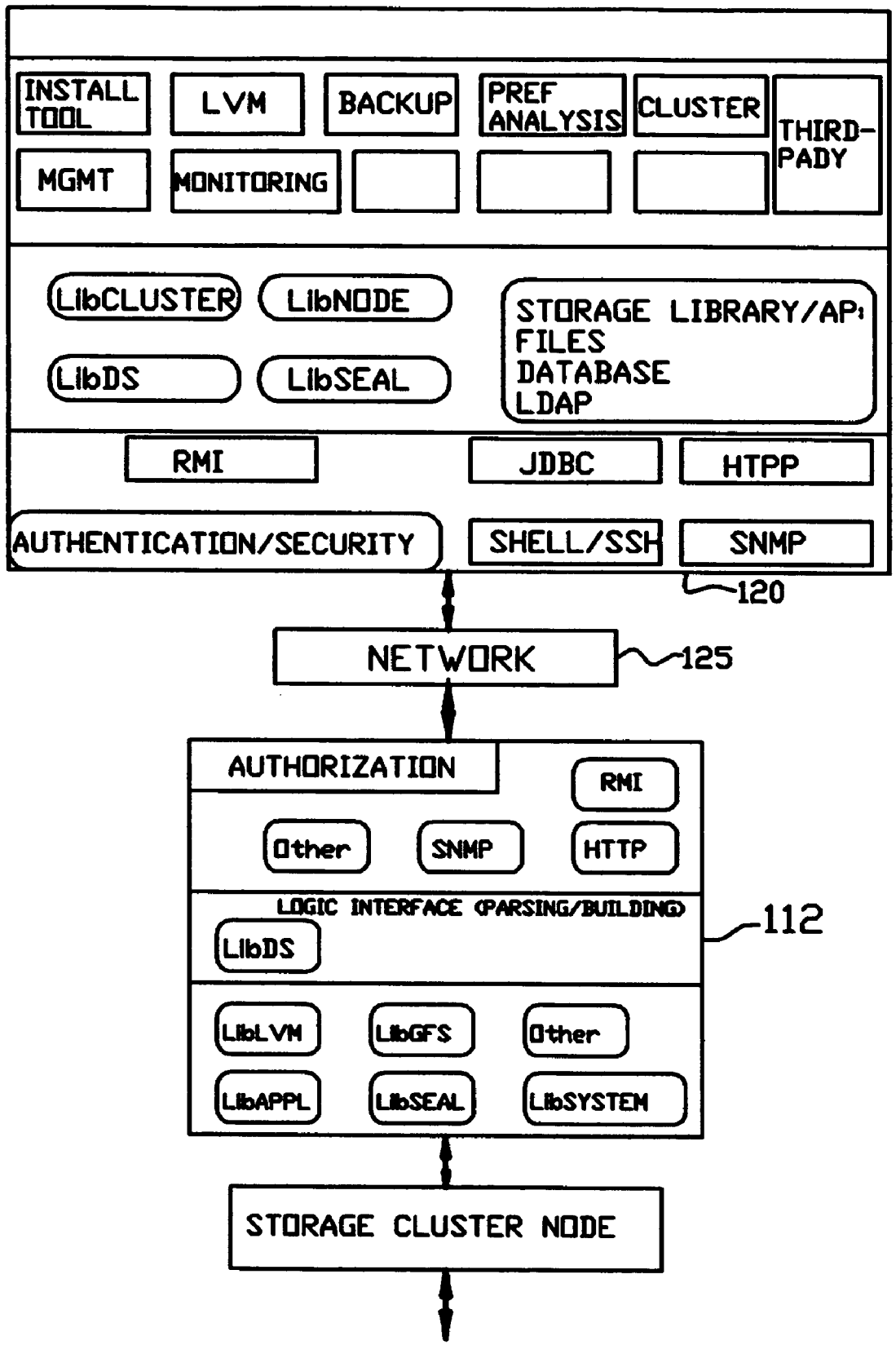
FIG. 2 is diagram depicting the management node of the present invention.

FIG. 2 provides additional detail concerning the structure of the present invention. Specifically management node 120 communicates via a network 125 with file server 112.

The actual GUI management framework, framework plugins, and standalone programs/utilities related to management run on the Management node 120. It is not a requirement that the management node be directly connected to any of the file servers 112 or have the ability to access any of the storage devices under its control. Management node 120 accomplishes management/query actions via a proxy to the file server 112. The proxy is a daemon running on each of the hosts 110. If management node 120 has direct access to the storage network or storage devices it may accomplish management/query actions without involving the proxy. The rationale behind such a scheme is to allow flexibility in determining where the management framework is run (i.e. administrator's notebook, administrator's desktop, server node, storage cluster node).

Management node 120 also has the ability to query/update the cluster infrastructure database directly as a result of management/query actions performed on the storage cluster. Cluster wide actions are initiated from management node 120 by utilizing a unifying library called "libCLUSTER". libCLUSTER will communicate cluster actions to the storage cluster nodes via appropriate authentication and communication libraries. Examples of cluster wide operations are: quiecse I/O operations to a GFS filesystem; unmount a GFS filesystem from an entire storage cluster; mount a GFS filesystem from an entire storage cluster; determine active storage cluster nodes in a particular GFS filesystem; determine active GFS filesystem in a storage cluster.

In the preferred embodiment, management node 120 utilize standard authentication, communication, and persistent storage libraries (files, LDAP, database) to accomplish communication between hosts 110 and the appropriate cluster infrastructure mechanism. Management node 120 has the capability of utilizing libSEAL for storage discovery actions is it is connected to the SAN. Otherwise, libSEAL actions are accomplished via a proxy. This is the most likely scenario since multiple GFS storage clusters may be managed via the framework.

In the preferred embodiment, files system 112 is comprised of an Agent Daemon running on every storage cluster node handles authentication, communication, and parsing of requests received from the management framework node. Node specific operations are performed via libGFS, libLVM, etc. . . . Node information not encoded in specific application libraries (libGFS, libLVM, libAMANDA, etc.) is handled via a more generalized library (libNODE); and a SNMP (UCD SNMP) is utilized when appropriate. This is useful for query actions vs. management actions which require authentication and authorization.

In the preferred embodiment, cluster infrastructure is comprised of the CIDEV—physical disk partition; LDAP and a direct database (such as Oracle).

In instances where helper libraries implement functionality via wrappers for Core Technology command line interfaces (CLIs) the wrappers should implement at a minimum: Validation of arguments for correctness and safety; Allocation and composition of the appropriate CLI instance based upon the validated parameters provided; Execution of the CLI command via an appropriate system call (i.e. system( )) or security mechanism; and check return codes and take appropriate actions based on them.

Referring again to FIG. 1, remote databases 130 may be utilized for decision making processes. They contain information on hardware, software, and firmware configurations that can be utilized to guide the user to an optimal solution for the particular instantiation of software and hardware they possess. Using a remote database 130 is desirable since it allows a master database to be maintained that is queried by the Framework and modules. As new hardware, software, and firmware is vetted it is added to the database making it immediately available to deployed installations.

Management node 120 also allows scripting this means the ability to take a sequence of actions and record them for playback. An example of where this is useful is during the configuration of file system 100. A skilled analyst could use the installation/configuration module to configure a single file server 112 and have their actions/settings saved. This "script" could then be distributed to other geographical locations and "replayed" to create identical configurations.

In the preferred embodiment, files system 100 uses a common reference clock to insure consistent file services, tagging of configuration files, and timestamping of log entries for problem analysis/verification. The default 'ntpd' from the Linux operating system is utilized if it is present. Appropriate configuration files (/etc/ntp.conf and rc startup scripts) will be generated.

"SSH" can be used as the AUTH and Remote Execution component of the framework. This coupled together with the capabilities of GSH and something like "cfengine" should provide us with enough functionality to get things going. Design work should take into account alternate AUTH and Execution methodologies whenever possible and appropriate to insure that new mechanisms can be introduced in the future.

Additional details concerning configuration of files system 100 are described in U.S. provisional application Ser. No. 60/352,822, filed Jan. 20, 2002 herein, incorporated by reference.

In the preferred embodiment, APIs are generalized such that vendor specific components are not required. Specifically, The present invention has a variety of functional requirements including: utilize database for state; individual nodes or daemons update the database; cooked APIs; logging/report of cluster transition events (i.e mounts, stomiths, X recovers for Y, time to accomplish recovery, number of buffers replayed, etc. . . . ); STOMITH stats (which nodes have been STOMITH'ed, frequency); node_universe( )—what nodes are out there or could possibly be out there—a list of node_ids; node_ipaddr(node_id)—IP address; node_cidev_defs(node_id)—cidev fields for the node; node_state (node_id)—up or down; node_membership(node_id)—cluster_id's of clusters the node is part of; node_stomith (node_id)—possible stomith methods for this node; clusters( )—a list of the existing cluster_ids; cluster_nodes (cluster_id)—the nodes which are part of a cluster; live_cluster_nodes(cluster_id)—the living nodes in a cluster; dead_cluster_nodes(cluster_id)—dead nodes; cluster_members(cluster_id)—the official "members" as decided by quorum; cluster_type(cluster_id)—GFS_cluster, LVM_cluster, etc; and cluster_state(cluster_id)—enabled, disabled, degraded, in-recovery.

In the preferred embodiment, the following evolve to more generalized interfaces as better cluster management tools/software becomes available:
    node_t nodeA;
    cluster_t clusterA;
    node_id_t nid;
    Generalized Node operations of interest to the cluster
    node_alive(nodeA) [TRUE, FALSE] (from libNODE)
    Generalized Cluster Operations/Queries
    node_is_member(clusterA, nodeA) [TRUE, FALSE]
    node_status(clusterA, nodeA) [up, recovering, stomith'ed, down]
    cluster_members(clusterA) [list of nodes]
    cluster_stomith_methods(nodeA) [list of stomith methods for nodeA]
    GFS Cluster Operations/Queries
    cluster_gfs_halt(clusterA)
    cluster_gfs_nodes_mounted(clusterA) [list of nodes]
    cluster_gfs_node_jid(clusterA, nodeA) [jid in use by nodeA]
    LVM Cluster Operations/Queries
    cluster_lvm_list_vg(clusterA) [list of VGs in use by clusterA]
    cluster_lvm_snapshot(clusterA, VG) [snapshot a VG in clusterA]

Management node 120 also uses a library that encapsulates the functionality and IOCTL access that is provided by the command line utilities (CLI) in a library. This library is utilized by elements (i.e. SAd) requiring the ability to extract information from the GFS subsystem and instantiate changes upon it (i.e. Advanced Management Module requesting that a Pool and its corresponding GFS file system be expanded).

Additional details concerning the functionality that is provided to outside modules is further described in U.S. provisional application Ser. No. 60/352,822, filed Jan. 20, 2002 herein, incorporated by reference.

In the preferred embodiment, disk servers 150 use a program called GNBD to coordinate disk server activities and function as disk server layer 155. Various functions are used to allow management node 120 to communicate with disk server layer 155 including:
    gnbd_gnbdsrv—Interface to the user-space gnbd export program
    gnbd_gnbdd—User-space binary that exports GNBDs
    gnbd_gserv—Interface to export block devices through gnbd
    gnbd_srvinfo—GNBD devices exported by a server with client list for each device
    gnbd_srvstats—Read/Write stats for GNBD devices active on a server
    gnbd_nodeinfo—List of GNBD devices active on a client list for each device
    gnbd_nodestats—GNDB read/write blocks stats for GNBD devices active on a storage client
    gnbd_bannode—Ban a storage node from connecting to a GNBD server (completely or on a per GNBD device basis Management node 120 also uses a library to perform dynamic discovery of elements within file system 100. Additional details concerning the functionality that is provided in this library are further described in U.S. provisional application Ser. No. 60/352,822, filed Jan. 20, 2002 herein, incorporated by reference.

Figure 3:
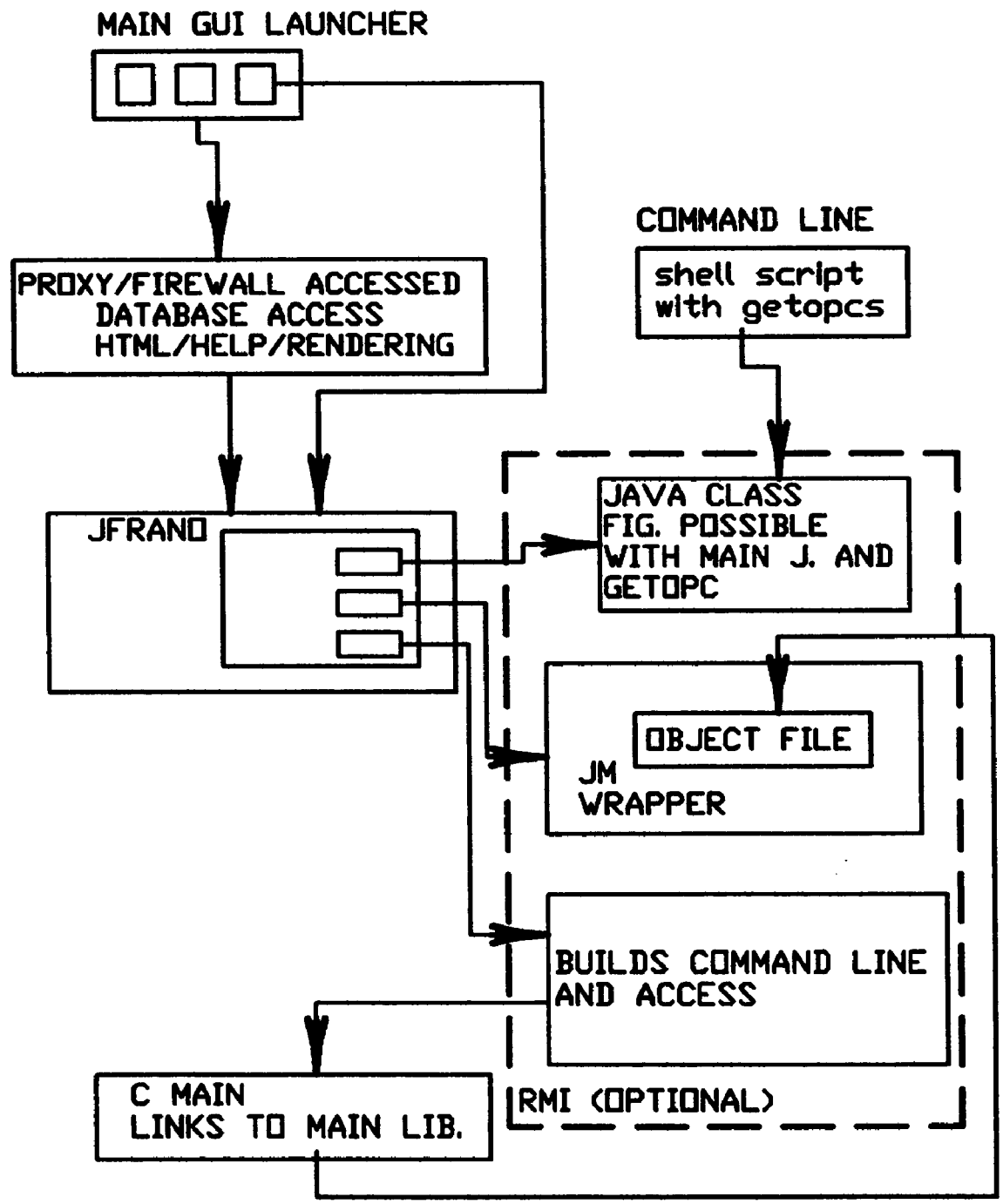
FIG. 3 is a block diagram of the preferred configuration of the present invention.
Figure 4:
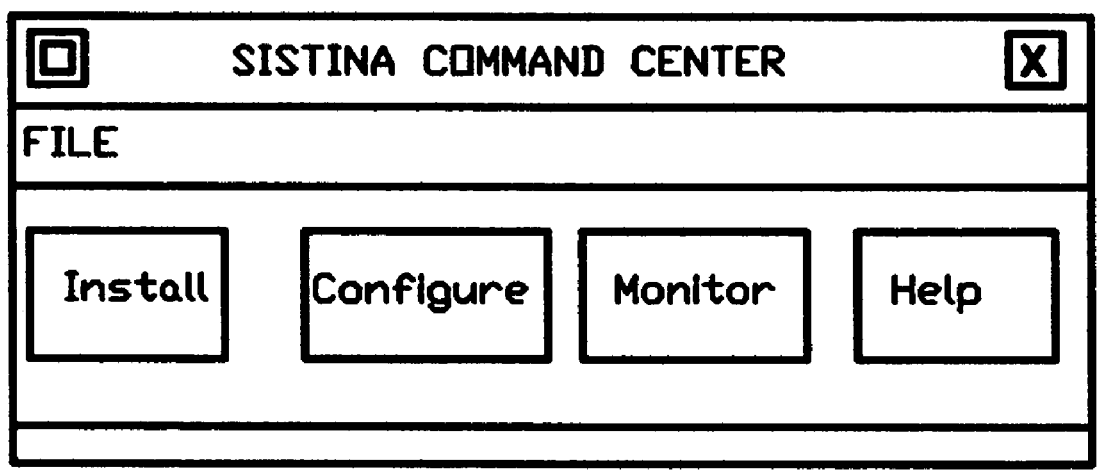
FIG. 4 depicts a portion of the user interface for controlling the file system of the present invention.
Figure 5:
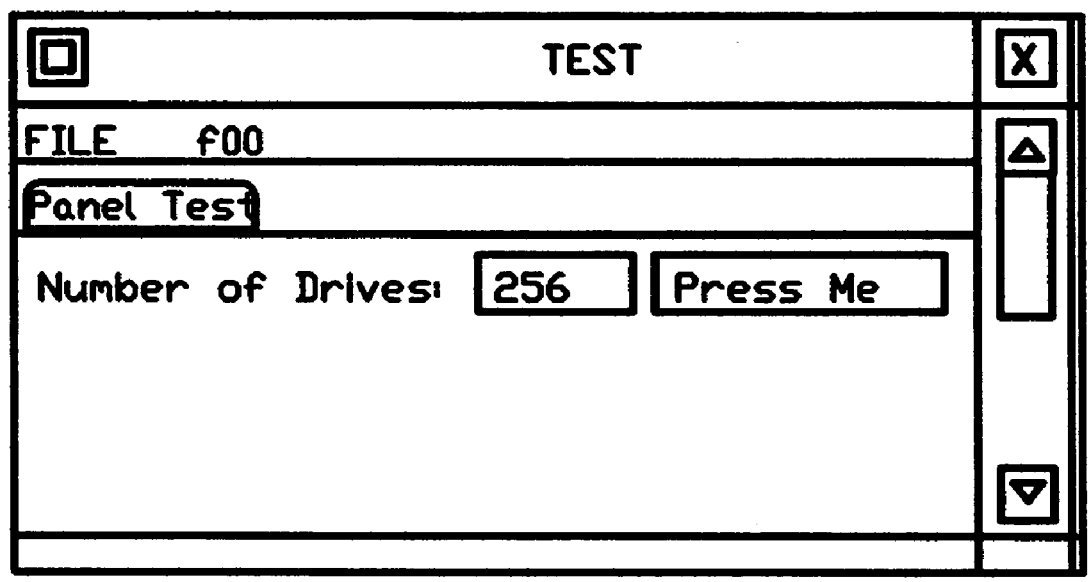
FIG. 5 depicts a portion of the user interface for controlling the file system of the present invention.

Management node 120 uses various base classes to form the GUI. FIG. 3 depicts one configuration of the present invention. "Bse" classes are used to create the various components of the module. These classes include basic functionality and the look and feel elements "out of the box" to save the module implementer some of the drudgery of building a GUI as well as helping create a unified appearance automatically. FIGS. 4 and 5 depict a portion of the user interface for controlling the file system of the present invention. These classes include basic functionality and the look and feel elements that are further described in U.S. provisional application Ser. No. 60/352,822, filed Jan. 20, 2002 herein, incorporated by reference.

Figure 6:
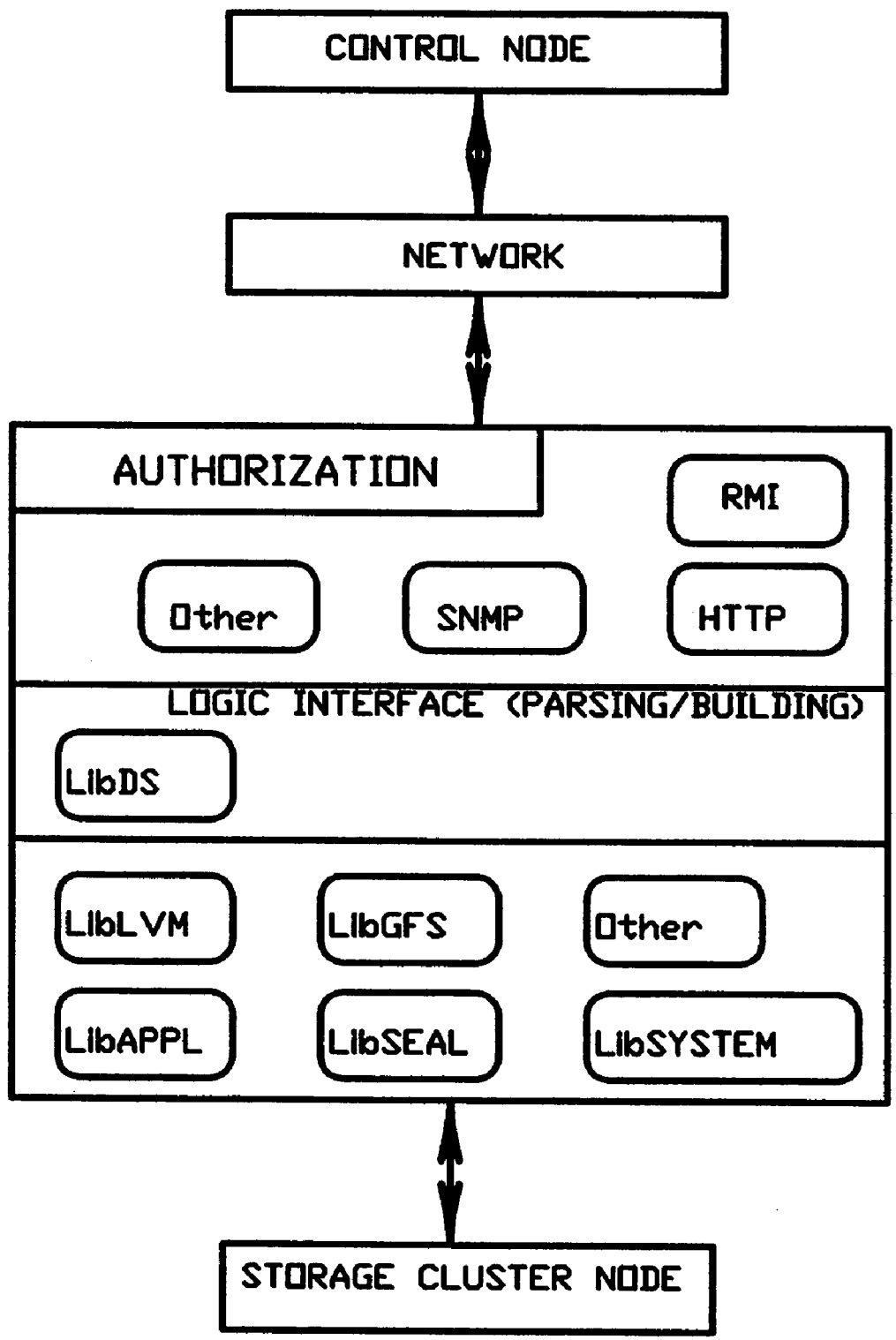
FIG. 6 depicts an interface module used in connection with the present invention.

Referring again to FIG. 2, an Agent Daemon (SAd) is executed by each host 110. It is capable of acquiring performance and health data about the one or more file systems 112 that are active on each host 110 node, as well as, health and performance data for other entities (LVM, Amanda, etc) installed on the node. The operation of this deamon is further described in U.S. provisional application Ser. No. 60/352, 822, filed Jan. 20, 2002 herein, incorporated by reference. FIG. 6 is an alternate depiction of the daemon used in connection with the present invention.

Figure 7:
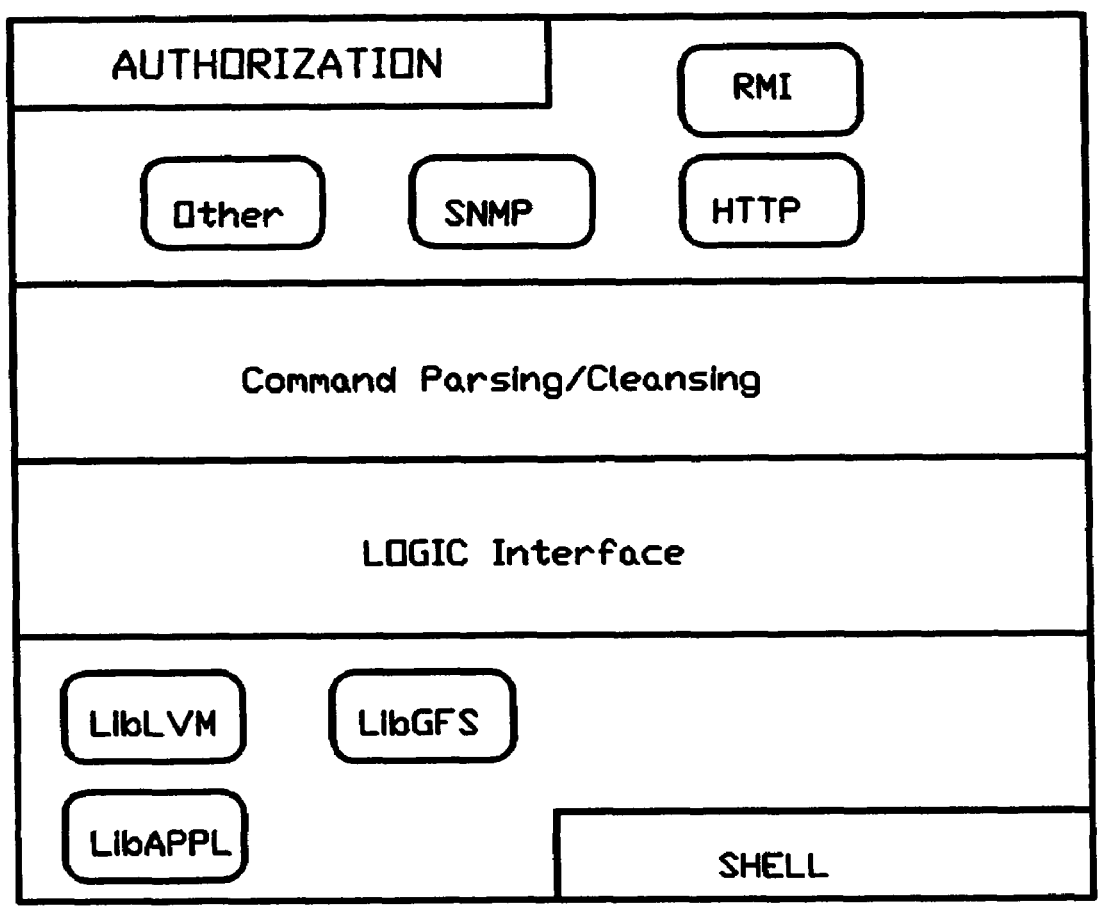
FIG. 7 depicts a remote execution module used in connection with the present invention.

FIG. 7 depicts a remote execution module used in connection with the present invention.

File system 100 also performs directory server management. The operation of these functions are further described in U.S. provisional application Ser. No. 60/352,822, filed Jan. 20, 2002 hereby incorporated by reference.

File system 100 utilizes a persistent storage library to store configuration and/or performance data. It is capable of reading/writing of configuration file(s), backup configurations, tape configurations, management files to local files, network file systems, LDAP, databases, and the like. The module is capable of setting, modifying, querying, and deleting administrative and configuration information need for persistent storage operations in a directory service (i.e. LDAP). This module is capable of reading/writing files locally on the node that the management framework is executing on. The module is capable of reading/writing files from a shared storage space (GFS, NFS, CIFs) that is accessible by the node the management framework is executing on. The module is capable of reading/writing information to either a local or network accessible database via standard methods (SQL or JDBC). The module possess the capability of streaming information from one node to another via defined protocols (SSL, HTTP, etc).

The file system 100 of the present invention uses an installation module for configuring and installing itself. The details of the installation are described in U.S. provisional application Ser. No. 60/352,822, filed Jan. 20, 2002 hereby, incorporated by reference.

Figure 8:
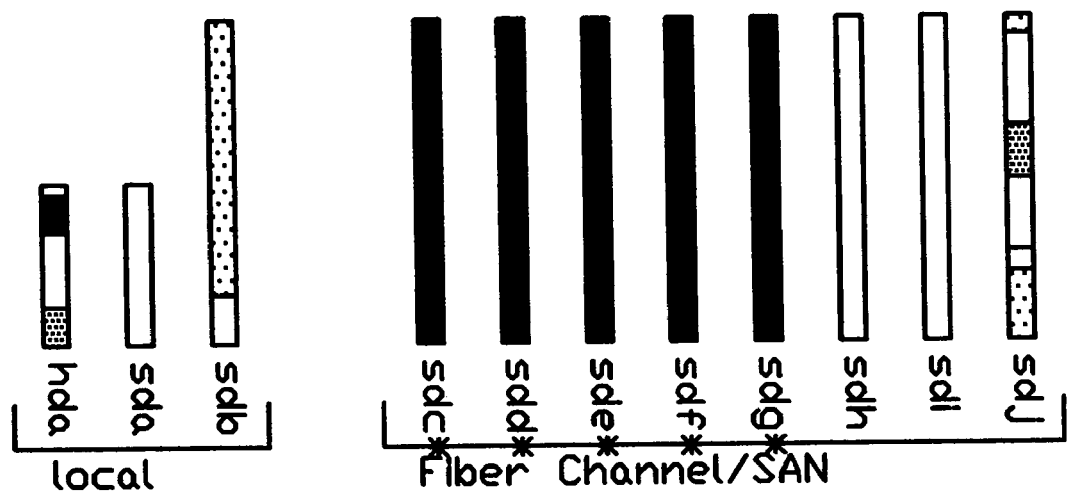
FIG. 8 depicts the device identification and allocation methodology used by the present invention.

FIG. 8 depicts the device identification and allocation methodology used by the present invention and displayed by management node 120. This feature performs a variety of functions.

For example, a graphical representation of known disk(s)/partition(s) may be displayed. The display provides an indication of whether the device is local (IDE/SCSI) or SAN attached (FC or parallel SCSI if possible), as well as, if the device is DMEP enabled. If possible it should also identify known partition types such as GFS, Ext2FS, ReiserFS, Linux Swap, FAT, unknown and unallocated.

The ability to define/change partition(s) on a particular device is available as an option. In the preferred embodiment, a user may "drag" a partition separator to new location on a device. If a device contains no existing partitions or a new partition is needed the user can "double-click" on the device to request creation of a new partition. "double-click" on an existing partition shall present a dialog and/or form for changing the characteristics of a partition (size, type, assigned/unassigned). "single-click-drag" on an existing partition will allow it to be repositioned on a device barring any conflicts with already existing partitions.

After a device/partition has been selected it is identified as being a member of the GFS file system that is currently being configured as should already selected device(s)/partition(s). This should be accomplished via a graphical (color coded), textual (label), or symbolic mechanism.

The addition of devices/partitions to the file system 100 being configured can be reflected via a status bar/field (i.e. current size). The minimum that shall be required to accomplish this step is to designate whole devices to be used in the file system 100. In the preferred embodiment there is an option for "not seeing" partitions and DMEP status and simply designating whole devices (default mode?). Below deck, at a later point, a determination of whether partitions should be made on the designated devices could/would be accomplished. This might be done via a "detailed view" where partitions and DMEP status are shown, and "basic view" where only simple partition states are shown. File system 100 can specify which partition to use for the Config partition. The remainder of the designated partitions can be assigned as either data or journal partition types. Assignment of partition/subpool type shall be accomplished by "single-click-hold" on the desired partition. This will then present a pop-up list of available partition/subpool types, including: specify pool and/or subpool name(s); definition and assignment of subpools from previously designated partitions (stripe, concat, data, journal). Subpool striping shall also be set at this time. If subpool striping is not set at this time a reasonable default shall be specified; and if the default values have not been overridden by the user, the preferred invention will leave them along and wait to change them. At a later point more information shall be available regarding the number of journals and whether journals should be allocated in different subpools.

In addition the locking method can be selected such as: Hardware based DMEP; or Host based lock server. If no DMEP capable devices have been selected option #1 shall not be available. If option #1 has been selected some optional custom configuration may occur (DMEP buffers on a DMEP capable device within the pool may not be utilized). If option #2 has been selected an IP address or the hostname of the lock server shall be a required entry. A port number may be optionally set as well.

A client can be designated via hostname, IP address, or CDIR (192.168.1.0/28). Optionally, the ability to build a selection list from which clients may be selected shall be available. The selection list shall be built from either '/etc/hosts' (local file or via YP/NIS map) or via a CDIR specification in conjunction with name space lookup. Clients can then be selected via this method, as well as, the single host methods specified earlier.

After all clients have been entered a sanity check is performed to determine whether they are valid or not. This is visually presented to the user as a list of selected clients with either a 'check' by them or color coded to represent whether or not they are reachable (ICMP) from the configuration host. If may be that the configuration host is not on the same network as the other clients so that ability to override the sanity check shall be provided for as well. In the case where the client is reachable from the configuration host and it does not pass the sanity check at this point it shall be possible to either remove the client from the selected set or modify its parameters so that it does pass the sanity check.

An option to "Add new STOMITH method". Selecting this option shall present a selection box to choose the method: FC Switch; network power switch; and X10. Optionally, the ability to skip configuring a STOMITH method shall be provided as well. In order to accomplish this a secondary confirmation shall be required with a notification stating that this is extremely dangerous and could lead to "bad things". Based on the selection of the method additional method specific configuration information shall be requested: FC Switch(es)—IP Address(es), Password, User; Network power switch(es)—IP Address(es), Password, User; and X10—House code.

For each host additional configuration information will have to be provided dependent upon the STOMITH method chosen: FC Switch—Zone Alias, Host designation on Switch; Network Power Switch—Plug number; and X10—Unit code.

Heuristic decisions can be made by the 'wizard' if defaults have been used at this point (i.e. no input overriding these "suggestions"): number of journals to create given the number of clients; and number of journal subpools to be created.

These decisions may be overridden via 'expert' options throughout the various dialogs/forms (i.e. choose the exact number of journals to make).

The Ability to write the specified configuration to a file other than the default.

The ability to generate a script which accomplishes the same tasks as the 'wizard' but in batch mode are available at this point. This could either be a shell script(s) which executes the commands (fdisk, ptool, gfsconf, gfs_mkfs) or a state/config file that can be fed to the 'wizard' and have it accomplish the tasks in 'batch' mode without manual intervention. The user shall also be able to specify alternate names/locations for the configuration file to be written to. If the user does not a provide additional guidance with regards to the configuration file naming/location a suitable default will be provided.

Additionally, if "passemble" was run at this point the wizard could set the DMEP buffer sizes and enable DMEP on the devices.

File system 100 also uses a performance analysis module that has the capability of storing the data via different mechanisms/formats (files, database, user defined) via the persistent storage module or discard it after processing. The data that is saved and/or forwarded to the Analyzer host and its frequency of sampling shall be specified via a config file or command line options. It shall be runtime configurable/changeable via a signal sent to it.

The Performance Analysis Module will take data provided via a number of SAd instances and provide a performance analysis report/graph/chart based upon the received data. In the preferred embodiment, there is more than one level of analysis provided by the module. The details of the module are described in U.S. provisional application Ser. No. 60/352,822, filed Jan. 20, 2002 hereby, incorporated by reference.

The Basic Administration Module (BAM) shall provide basic administrative information and administrative control for GFS filesystems in the storage cluster. Information acquisition and control shall be accomplished via SAd, libSEAL, libGFS, and libLVM.

The module uses the storage cluster security mechanism for remote execution of commands and is capable of setting, modifying, querying, and deleting administrative and configuration information need for GFS operations in a directory service (i.e. LDAP)

The module displays all known GFS storage clusters. This information includes at a minimum: Nodes in the storage cluster; Locking methodology utilized by the GFS storage cluster [DLM, HW DMEP, SW DMEP (memexpd)]; All filesystems that compose a GFS storage cluster.

The module displays all known GFS filesystems. This information includes at a minimum: The capacity of the GFS filesystem The GFS FS to Volume (Pool/CLVM) mapping The number of nodes currently mounting the designated GFS filesystem (1) The number of nodes that compose the valid set of nodes to mount/access a specific GFS file system (2) The number of journals that are configured for a specific GFS filesystem (either separate journal subpool or journals allocated from within the GFS data pool)

The module displays all known volume(s) (Pool/CLVM)

Volume (Pool/CLVM) to FS mapping (1) Configuration devices vs. Data devices (1) Active (mounted) vs Inactive (unmounted)

(2) Type [GFS, Ext3, ReiserFS, Snapshot, . . . ]

Display unassigned disks/partitions available for use local disks (IDE/ATA/SCSI/USB/Firewire)

network disks (Fibre Channel/iSCSI/Infiniband)

disk/partition type (Linux, FAT, *BSD, Solaris, LVM, Pool, . . . )

Display locally attached disks (IDE/SCSI/USB/Firewire) and partition types ((Linux, FAT, *BSD, Solaris, LVM, Pool, . . . ) [For use as a LVM sysadm module or when only a local GFS FS is in use]

Display all FC devices that are known: disks; switches and hubs.

Display known clients: Show filesystem(s) configured; Show filesystem(s) mounted/active; Show status.

If a STOMITH power on/off capability exists and a storage node is configured to utilize this method it shall be possible to power on/off the storage node via this module. Appropriate security mechanisms shall be employed to assure that this action may not be taken by unauthorized entities.

Mount/Unmount GFS filesystems from GFS storage nodes.

The Advanced Administration Module builds upon the basic module and adds additional functionality as further described in U.S. provisional application Ser. No. 60/352, 822, filed Jan. 20, 2002 hereby, incorporated by reference.

The LVM Basic Administration Module (BAM) provides basic administrative information and administrative control of LVM entities in the storage cluster. Information acquisition and control shall be accomplished via SAd, libSEAL, libGFS, and libLVM and is as further described in U.S. provisional application Ser. No. 60/352,822, filed Jan. 20, 2002 hereby, incorporated by reference.

The advanced administration module builds upon the basic module and adds additional functionality as further described in U.S. provisional application Ser. No. 60/352,822, filed Jan. 20, 2002 hereby, incorporated by reference.

The Quota Administration Module (QAM) provides the ability to administer, monitor, and report on quotas for a specified filesystem as further described in U.S. provisional application Ser. No. 60/352,822, filed Jan. 20, 2002 hereby, incorporated by reference. The Present invention allows the administrator to limit the amount of disk space each user the consumes. The administrator sets these "quotas" and the filesystem prevents the user from allocating more disk space than they're allowed.

The quota implementation of the present invention will support fuzzy quotas. When all the quota changes to a particular user identification number (UID) or group identification number (GID) happen on one machine, that one machine has all the information necessary to accurately enforce the quota limit on the user. When multiple machines are doing [de]allocations on the same ID, the current value of the number of blocks allocated to that UID will be stored fuzzily. The value isn't guaranteed to be absolutely consistent across the cluster, but it will be "mostly" right.

Quotas are transactional—each [de]allocation is a transaction that includes the FS blocks that were modified by the transaction and one or more quota changes to the ID's quota value.

These transactions are committed into the machine's log atomically. That way if the machine crashes, the quotas are consistent and no quota checker program is needed.

The present invention implements quota in a different way the prior art. An allocation transaction in most filesystems will include the actual changes to the quota file as part of the transaction. So, every transaction that does a [de]allocation causes an immediate change to the quota file. In GFS, this would become severe bottleneck. Every transaction on every machine in the cluster would be trying to modify one resource. So, GFS adds quota change tags to each transaction and those tags are accumulated in each machine's journal. Periodically, they are copied out of the journal and into the quota file. So, each [de]allocation changes only local quota data and the quota file is changed only asynchronously.

The other part is that the current quota data (limits and current values) are cache in Lock Value Blocks (LVBs) for each ID. Each machine manipulating a ID acquires a shared hold on the ID's lock. It can then do the comparison of the current usage value and the limit without having to be constantly reading the quota file. The data in the LVBs is updated when the corresponding ID is updated in the quota file—so, the LVBs always represent what's in the quota file, and not any changes that have happened in the journals since.

Since quotas are fuzzy, it's possible for a user to overrun his quota. It's worthwhile to limit how much the overrun can be, however. Each machine knows the current quota data in the quota file (by looking at the contents of the ID's LVB), the amount of space allocated by that machine that hasn't been copied into the quota file, and the number of machines in the cluster. It can use this information to figure out how often the quota changes should be synced to the quota file. The closer the ID is to its limit, the more often the changes are synced.

The Shared-Root module provides the necessary administrative controls for creating and/or managing shared-root clusters as further described in U.S. provisional application Ser. No. 60/352,822, filed Jan. 20, 2002 hereby, incorporated by reference. The module uses the storage cluster security mechanism when appropriate for execution of privileged commands on either local or remote storage cluster nodes. The module is capable of setting, modifying, querying, and deleting administrative and configuration information need for GFS shared-root operations in a directory service (i.e. LDAP).

In the preferred embodiment, managing the shared root/ boot environments is preferred. It might also become a mechanism for using Memory Export as a locking protocol for cluster/distributed applications.

Creation of Shared-Root Filesystem/Device
Display a graphical representation of known disk(s)/partition(s) as shown in FIG. 8. The display shall provide an indication of whether the device is local (IDE/SCSI) or SAN attached (FC or parallel SCSI if possible), as well as, if the device is DMEP enabled. If possible it should also identify known partition types. A potential list of known partition types is provided below:
GFS
Ext2FS
ReiserFS
Linux Swap
FAT
unknown
unallocated The ability to define/change partition(s) on a particular device is available to the user. The preferred mechanism allows user to "drag" a partition separator to new location on a device. If a device contains no existing partitions or a new partition is needed the user can "double-click" on the device to request creation of a new partition. "double-click" on an existing partition shall present a dialog and/or form for changing the characteristics of a partition (size, type, assigned/unassigned). "single-click-drag" on an existing partition will allow it to be repositioned on a device barring any conflicts with already existing partitions.

After a device/partition has been selected it is identified as being a member of the GFS file system is that is currently being configured as should already selected device(s)/ partition(s). This should be accomplished via a graphical (color coded), textual (label), or symbolic mechanism.

Addition of devices/partitions to the GFS file system being configured shall be reflected via a status bar/field (i.e. current size)

The minimum that is required to accomplish this step is to designate whole devices to be used in the GFS file system. There is an option for "not seeing" partitions and DMEP status and simply designating whole devices (default mode?). Below deck, at a later point, a determination of whether partitions should be made on the designated devices could/would be accomplished. This might be done via a "detailed view" where partitions and DMEP status are shown, and "basic view" where only simple partition states are shown.

Additional Options are Available:
Specify which partition to use for the Config partition. The remainder of the designated partitions shall be assigned as either data or journal partition types. Assignment of partition/subpool type shall be accomplished by "single-click-hold" on the desired partition. This will then present a pop-up list of available partition/subpool types.

Specify pool and/or subpool name(s).

Definition and assignment of subpools from previously designated partitions (stripe, concat, data, journal). Subpool striping shall also be set at this time. If subpool striping is not set at this time a reasonable default shall be specified.

Default Device(s) Details
If the default values have not been overridden leave them along and wait to change them. At a later point more information shall be available regarding the number of journals and whether journals should be allocated in different subpools.

Locking Method
Select locking method:
1. Hardware based DMEP
2. Host based lock server If no DMEP capable devices have been selected option #1 shall not be available. If option #1 has been selected some optional custom configuration may occur (DMEP buffers on a DMEP capable device within the pool may not be utilized). If option #2 has been selected an IP address or the hostname of the lock server shall be a required entry. A port number may be optionally set as well.

GFS Clients
Enable new GFS clients. A client is designated via hostname, IP address, or CDIR (192.168.1.0/28). Optionally, the ability to build a selection list from which GFS clients may be selected is available. The selection list shall be built from either '/etc/hosts' (local file or via YP/NIS map) or via a CDIR specification in conjunction with name space lookup. GFS clients can then be selected via this method, as well as, the single host methods specified earlier.

After all GFS clients have been entered a sanity check shall be performed to determine whether they are valid or not. This is visually presented to the user as a list of selected GFS clients with either a 'check' by them or color coded to represent whether or not they are reachable (ICMP) from the configuration host. If may be that the configuration host is not on the same network as the other GFS clients so that ability to override the sanity check shall be provided for as well. In the case where the GFS client is reachable from the configuration host and it does not pass the sanity check at this point it shall be possible to either remove the GFS client from the selected set or modify its parameters so that it does pass the sanity check.

STOMITH

An option to "Add new STOMITH method". Selecting this option presents a selection box to choose the method:
FC Switch
Network power Switch
X10

Optionally, the ability to skip configuring a STOMITH method shall be provided as well. In order to accomplish this a secondary confirmation shall be required with a notification stating that this is extremely dangerous and could lead to "bad things".

Based on the selection of the method additional method specific configuration information shall be requested:
FC Switch(es)—IP Address(es), Password, User
Network power switch(es)—IP Address(es), Password, User
X10—House code For each host additional configuration information will have to be provided dependent upon the STOMITH method chosen:
FC Switch—Zone Alias, Host designation on Switch
Network Power Switch—Plug number
X10—Unitcode Final Step Heuristic decisions can be made by the 'wizard' if defaults have been used at this point (i.e. no input overriding these "suggestions"):
Number of journals to create given the number of GFS clients
Number of journal subpools to be created.

These decisions may be overridden via 'expert' options throughout the various dialogs/forms (i.e. choose the exact number of journals to make).

The preferred embodiment generates a script which accomplishes the same tasks as the 'wizard' but in batch mode shall be available at this point. This could either be a shell script(s) which executes the commands (fdisk, ptool, gfsconf, gfs_mkfs) or a state/config file that can be fed to the 'wizard' and have it accomplish the tasks in 'batch' mode without manual intervention. The user shall also be able to specify alternate names/locations for the configuration file to be written to. If the user does not a provide additional guidance with regards to the configuration file naming/location a suitable default will be provided.

Additionally, if "passemble" was run at this point the wizard could set the DMEP buffer sizes and enable DMEP on the devices.

Create the GFS shared-root filesystem. This will involve either "cloning" an existing "root" file system (local, NFS, GFS) or doing a clean install on to the new GFS filesystem. Mount the new GFS shared-root filesystem and perform client specific configuration for the initial client (/etc file mods, etc. . . . )

Add additional clients to the new shared-root and perform required configuration steps. The number of clients will most likely be known at this point since we are requiring client information earlier on. We should take advantage of that information whenever possible for sanity checking.

Generate RAM/Floopy disk image for shared boot

Add client to shared-root
Select existing GFS shared-root FS
Does it have enough journals to support a new client? If not—create
Modify GFS_conf
Add additional directories/files to shared root for new GFS client
Generate RAM/Floppy disk image for shared boot Alarm/Monitoring Module The Alarm/Monitoring module provides administrative control for setting and monitoring alarms for identified components within GFS, LVM, and any other subsystem that supports alarms and monitoring.

1. The module creates directory service entries for specified alarms/monitors. Alarm/monitoring entries shall conform to a standardized scheme (designed by Sistina) that will be utilized whenever appropriate throughout the Software Framework.
2. The module queries directory service entries to determine alarm/monitor values/levels. Since alarm/monitoring entries shall be standardized all modules shall access to this information. This module will be the primary entity for interacting with them though.
3. The module removes directory service entries for specified alarms/monitors
4. The module sets directory service entries for specified alarms/monitors
5. The module sets 'syslog' entries on participating nodes for reporting purposes. Whenever possible, information of a global nature is stored within LDAP directory services. This allows cluster/distributed operations to access to the data from a single master repository whenever possible. In the case where an application can not utilize directory services the data shall be stored in a manner appropriate for the application (syslog→localhost:/etc/syslog.conf) and in the LDAP directory service. This insures that other applications can access the data from a single point when necessary.
6. The module has the ability of setting alarms based on the following criteria:
   a. Number of inodes in use per filesystem [Min, Max], [GFS]
   b. Capacity of the filesystem on a per filesystem basis [Min, Max], [GFS, Ext?, etc]
   c. Quotas
      Hard [Min, Max] files per user
      Soft [Min, Max] files per user
      Hard [Min, Max] files per group
      Soft [Min, Max] files per group d. The ability to set appropriate error thresholds on a per node per filesystem basis (i.e. network errors, disk errors)
e. The ability to set error alarm thresholds on a per device basis (i.e. per disk, per network interface, per HBA)
f. The ability to set aggregate error alarm thresholds on a per storage cluster or filesystem basis [GFS, disk, switch, network]
g. The ability to set read/write alarm thresholds (MB/s, IOPs) on a per node per filesystem basis
h. The ability to set aggregate read/write alarm thresholds (MB/s, IOPs) on a per filesystem basis [GFS, disk, switch]
i. The ability to set cache use/reuse alarm levels on a per node per filesystem basis
j. The ability to set aggregate cache use/reuse alarms levels on a per filesystem basis [GFS]
k. The ability to set read/write thresholds for devices (Fibre Channel disks, Fibre Channel switches/hubs, direct attached disks, portable media devices)
l. The ability to set alarm thresholds for syslog entries
7. The module shall have the ability of monitoring for alarms that have be set based on the following criteria:
    a. Number of inodes in use per filesystem [Min, Max], [GFS]
    b. Capacity per filesystem [Min, Max], [GFS, Ext?, etc]
    c. Quotas
        Hard [Min, Max] files per user
        Soft [Min, Max] files per user
        Hard [Min, Max] files per group
        Soft [Min, Max] files per group
    d. Error thresholds on a per node per filesystem basis (disk, NIC, HBA)
    e. Error thresholds on a per device basis (disk, NIC, HBA)
    f. Aggregate error thresholds on a per storage cluster or filesystem basis [GFS, disk, switch, network]
    g. Read/Write thresholds (MB/s, IOPs) on a per node per filesystem basis
    h. Aggregate Read/Write thresholds (MB/s, IOPs) on a per filesystem basis [GFS, disk, switch]
    i. Cache use/reuse levels on a per node per filesystem basis
    j. Aggregate cache use/reuse levels on a per filesystem basis
    k. Read/Write thresholds for devices (Fibre Channel disks, Fibre Channel switches/hubs, direct attached disks, portable media devices)
    l. The ability to set monitoring thresholds for syslog entries
1. Syslog—Syslog entries can be handled in a number of different manners:
    write-local, analyze-local, report to SAd
    write-local, forward to syslog host, syslog host analysis, forward if necessary
    forward to syslog host, syslog host analysis, forward to Performance Monitor (if monitor not running on syslog host)
2. Most other alarms/monitors are delivered to SAd for forwarding to the "master" framework node or to intermediary multiplex/demulitplex nodes which in turn communicate with the "master" framework node.
24 Backup/Restore Module The backup/restore module provides administrative information from and control of backup subsystems associated with the storage cluster nodes.

1. It provides the capability of setting, modifying, querying, and deleting administrative and configuration information needed for backup/restore operations in a directory service (i.e. LDAP)
2. The module uses the storage cluster security mechanism for remote execution of commands
3. It provides the capability of setting, modifying, querying and deleting administrative and configuration information needed for backup/restore operations on a per storage node basis (local file system) by extracting this info from a directory service for local file mods and sync-ing back to the directory service database upon update.
4. It provides the ability to do basic backup operations via a Sistina backup/restore (i.e native GFS dump/restore) or external backup/restore subsystem (AMANDA, Veritas NetBackup, Legato NetWorker).
5. Select Backup/Restore subsystem (if more than one): Amanda/NetBackup/Budtool/etc.
6. Configure Backup/Restore subsystem for a specified filesystem and/or host
    Identify clients
    Determine backup schedule (full, incremental, daily, weekly, etc)
    Backup media device
7. Determine media changer support for the backup subsystem
8. Configure media changer support for the backup subsystem
9. Modify existing Backup configurations
    Add client(s)
    Modify Backup Schedule (filesystem, host, set)
    Add Backup Media Device
    Change Backup Media device
        Does it posses Media changer support ??
10. Backup status/progress/reports
11. Restore
    Incremental filesystem restores
    Incremental host restores
    Full filesystem restore
    Full host restore
    Directory/Directories restores [per directory, per user]
    File(s) restores [per file, per user]

libAMANDA

CLI wrappers for the AMANDA backup system (http://www.amanda.org)
1. amanda_amlabel—writes an Amanda label on the tape in the tape drive specified by the amanda.conf
2. amanda_amtape—performs various tape changer control operations
3. amanda_amrmtape—allows invalidation of the contents of an existing backup tape in the config configuration database
4. amanda_amdump—switches to the appropriate Amanda configuration directory, usually /usr/local/etc/amanda/config, and attempts to back up every disk/filesystem as specified by the amanda.conf file
5. amanda_amrestore—extracts all files from the tapedevice that match the hostname and diskname given on the command line
6. amanda_amadmin—performs various administrative tasks on the Amanda configuration specified by the config argument
7. amanda_amcheck—runs a number of self-checks on both the Amanda Tape Server Host and the Amanda Backup Client Hosts
8. amanda_amcheckdb—verifies the Amanada database 9. amanda_amcleanup—generates the Amanda Mail Report and updates the Amanda databases after a system failure on the master host
10. amanda_amflush—writes all the Amanda backup files from the holding disk to tape, and updates the Amanda info database and tape list
11. amanda_amplot—reads an amdump file that Amanda generates each run and translates the information in it into a plot which can be used for determining bottlenecks and/or the performance of your configuration
12. amanda_amtoc—generates a TOC for an amanda run
13. amanda_amverify—verifies the ability of a Amanda configuration to perform a backup operation.

Steps that will need to be performed by the GUI frontend:
1. Install AMANDA
Install Related Packages
Perform Preliminary Setup
Configure the AMANDA Build
Build and Install AMANDA
2. Configure AMANDA
Decide on a Tape Server
Decide Which Tape Devices to Use
Decide Whether to Use Compression
Decide Where the Holding Space Will Be
Compute the Dump Cycle
Modify the Default Configuration File
Configure the Holding Disk
Configure Tape Devices and Label Tapes
Configure Backup Clients
Test and Debug Setup
3. Operate AMANDA
Run amdump
Generate and Read AMANDA's Reports
Monitor Tape and Holding Disk Status
Add Tapes at a Particular Position in the Cycle
Adjust the Backup Cycle
  Adjust Parallelism
  Monitor for Possible Improvements
  Excluding Files
Restoring with AMANDA
  Configuring and Using amrecover
  Restoring Without AMANDA
25 Tertiary Media Management Module This module encapsulates the functionality and IOCTL access that is provided by available tertiary media management subsystems and the underlying operating system (Linux, FreeBSD, Solaris, etc.) The module is used by any element requiring the ability to acquire tertiary media information from the operating system and tertiary media devices, as well as, instantiate changes upon the tertiary media subsystem. This functionality may be provided directly by the module or via a shim/helper library as further described in U.S. provisional application Ser. No. 60/352,822, filed Jan. 20, 2002 hereby incorporated by reference.

This module manages the overall security/authentication infrastructure required by the remote execution model for the storage cluster control mechanism as further described in U.S. provisional application Ser. No. 60/352,822, filed Jan. 20, 2002 hereby incorporated by reference. The module has the capability to either setup or guide a user through the process of setting up an appropriate security mechanism throughout the storage cluster nodes. The module has the capability of utilizing multiple security mechanisms to accomplish tasks (i.e. SSH, SSL, Kerb5). The module has the capability of specifying a default security mechanism that all modules shall utilize. The module has the capability of storing security certificates and keys in a secure LDAP directory service (i.e. KerDAP). The module has the capability of allowing/denying access to nodes on a per [node, user, port] basis. The module also has the capability of being able to advise on network port security (i.e. turn off the following potentially unneeded services).

The module has an auditing capability and is capable of tracking and reporting which (modules,actions) have been instantiated by a particular user on a per node basis. The module is capable of authorizing fine-grained administrator access on a per user ID basis versus a single 'administrator' ID. This allows the following capabilities: Allowing only a subset of all "administrator" capabilities to a specified user (i.e. User IP operator could query almost any piece of information, but only User ID wombat would be allowed to do 'mkfs_gfs'.); and auditing of actions on a per user ID basis.

A Load Balancing Virtual Server is a piece of software which makes a farm or cluster of servers appear to be one server to an outside client. This apparent single server is called a "virtual server". The individual servers (real-servers) are under the control of a director (or load balancer). The client is connected to one particular real-server for the duration of its connection to the virtual server. This connection is chosen and managed by the director. The real-servers serve services (eg ftp, http, dns, telnet, nntp, smtp) such as are found in /etc/services or inetd.conf. The virtual server presents one IP on the director (the virtual IP, VIP) to clients. A load balancing virtual server is useful for:

Higher Throughput. The cost of increasing throughput by adding real-servers in an load balancing virtual server environment increases linearly, whereas the cost of increased throughput by buying a larger single machine increases faster than linearly
  Redundancy. Individual machines can be switched out of the load balancing virtual server environment, upgraded and brought back on line without interruption of service to the clients. Nodes can move to a new site and brought on line one at a time while machines are removed from the old site, without interruption of service to the clients.
  Adaptability. If the throughput is expected to change gradually (as a business builds up), or quickly (for an event), the number of servers can be increased (and then decreased) transparently to the clients.
1. Selection of forwarding type
NAT—Network Address Translation
Direct Routing—MAC addresses on the packets are modified and the packet forwarded to the real-server
Tunneling—The packet is IPIP encapsulated and forward to the real server
2. Selection of network(s)
3. Number of interfaces on the LBVS
4. services to server mapping
5. weight assignment for servers
6. scheduling algorithm
round robin
weighted round robin
least connected
weighted least connected
persistent connection
destination hash
source hash [multiple firewalls]
other
7. add services for balancing
8. remove services from balancing
9. shutdown services (weight=0) [replacement, reconfigure, maint]
  10. save LBVS settings 11. load LBVS settings
12. assign services to servers (single, grouping)
13. remove services from servers
14. CIDR grouping
15. Failover configuration between LBVS
16. Detecting real-server failure
17. Re-activate failed real-servers 28 Hierarchical Storage Management Module This module encapsulates the functionality and IOCTL access that is provided by the X/DMIG capabilities within GFS and the underlying operating system (Linux, FreeBSD, Solaris, etc.) The module shall be utilized by any element requiring the ability to acquire X/DMIG information from GFS and the underlying operating system and to instantiate changes upon the X/DMIG subsystem. This functionality may be provided directly by the module or via a shim/helper library.

1. The module shall be capable of setting, modifying, querying, and deleting administrative and configuration information need for HSM operations in a directory service (i.e. LDAP)
2. Read X/DMIG information from the filesystem/operating system
    File/Directory state→Online vs. Migrated vs. Dual-state
    Percentage Online vs Migrated vs Dual-state
    Migrations outstanding
3. Read X/DMIG information from a HSM subsystem
    Total number of migrated files/directories
    Amount of tertiary media [total, in-use, available]
    Types of tertiary media in use
    multiple copies
    Number of migrations in progress
    Number of recalls in progress
    Devices allocated to HSM subsystem (disks, tapes, cdrom, etc)
    File/Directory to HSM media mapping
4. Set X/DMIG information in the filesystem/operating system
    State [Online, Migrated, Dual-state]
    X/DMIG file handle
5. Set X/DMIG information in HSM subsystem
    X/DMIG file handle to file/directory name mapping
    X/DMIG file handle to media mapping
    X/DMIG file handle state [Online, Migrated, Dual-state, soft delete, hard delete]
6. Setup/Invoke migration of a file(s) to a HSM subsystem. The HSM subsystem may be either a Sistina written HSM or one available from another source (open or commercial)
7. Setup/Recall a migrated file(s) from a HSM subsystem. The HSM subsystem may be either a Sistina written HSM or one available from another source (open or commercial)

1. User Commands
dmget—retrieve a XDSM migrated entity
dmput—migrate a file/directory to tiertiary media
dmls,find—determine what state an entity is in (online, migrated, dual-state [online & migrated]
2. Admin Commands
xdsmaudit—Determine discrepancies between file systems and the XDSM daemon database.
xdsmcheck—Verify the XDSM installation and configuration. Reports any problems.
xdsmdadm—XDSM daemon database administrative functions, such as updating a marker in the database entries or viewing individual database records
xdsmdaemon—XDSM daemon
xdsmdbcheck—Checks the consistency of a database by validating the location and key values associated with each record and key in the data and key files
xdsmdbrecover—Updates the daemon and tape databases with journal entries.
xdsmidle—Files not yet copied to tape are flushed to tape even if this means forcing only a small amount of data out to the media
xdsmstat—Indicates the current status of xdsmdaemon.
xdsmdelete—removes unused XDSM daemon database entries and releases corresponding media space.
xdsmmigrate—Migrates all regular files in the specified file systems
xdsmsnap—Makes snaphost of databases used by the XDSM daemon and the media specific devices/daemons
3. Storage Management Commands
xdsmfsmon—Determines free space and automatic migration of files on XDSM managed file systems
xdsmscanfs—Scan XDSM file systems and print status information
xdsmfill—Recalls migrated files to fill a percentage of a file system. This is mainly used in conjunction with dump and restore commands to return a corrupted file system to a previously known valid state.
xdsmloadfs—Loads a directory or file system with offline files. This can be used as part of a procedure to convert non-XDSM managed file systems to XDSM-managed file systems.
xdsmmove—Moves copies of a migrated file's data to specified media (maybe you have multiple tertiary storage devices and you desire multiple copies of the migrated data Application Specific Module(s)
1. The module is capable of setting, modifying, querying, and deleting administrative and configuration information need for Application specific operations in a directory service (i.e. LDAP)
2. The module uses the storage cluster security mechanism for remote execution of commands
3. NFS
    Centralized control of actions and configuration modifications
    This requires the ability to execute programs and instantiate changes on remote nodes from where the "master" application module is executing. This will be accomplished via a secure, remote execution model that is standardized across the storage cluster.
    Create/Modify export controls [node, filesystem, dir, client]
    Enable/Disable export [node, filesystem, dir, client]
4. Samba
5. SMTP
6. HTTP
7. FTP Several procedures can be implemented to increase operating performance: implement asynchronous locking and directory-based read-ahead.

When doing operations that traverse directory trees, the majority of GFS' time is spent waiting for reads from the disk. The traditional way of minimizing this time is to do read-ahead on inodes. It's problematic to do standard filesystem read-ahead in GFS because neighboring blocks aren't necessarily protected by the same lock.

The solution is to add asynchronous locking to GFS. When GFS reads a directory it can start sending out asynchronous requests to acquire the locks for the inodes in that directory. The notification routine that lets GFS know that an async lock request has succeeded can then fire off an asynchronous read request for inode block protected by that lock.

In this way, we get the advantages of a local file system's read-ahead without violating our locking constraints.

Fix shared locks between processes

GFS supports reader/writer locks—either *one* machine holds a lock exclusively so it can write the data protected by that lock or *many* machines hold the lock shared so that they can read the data protected by that lock. This allows the (more common) read operations to happen in parallel and write operations to happen correctly.

This behavior is what happens between different machines in the cluster, but it's not what happens between different processes on one machine. Even if processes acquire shared locks, they are still treated as exclusive locks between process.

Don't always inval on promote/demote

When GFS promotes a lock from a shared state to an exclusive state, there is a potential deadlock case with other machines trying to do the same thing—none of the machines can do the promotion until the other machines unlock their shared locks, but they don't because they are busy trying to do the promotion. This deadlock case is handled by the lock module. The lock module causes some (or all) of the machines to back off (drop their shared lock) and try again.

Since it is possible that the lock is dropped during a promotion, GFS assumes that it will happen and it invalidates its cache for the lock every time a lock changes state. This leads to inefficient behavior in the case where the lock was never dropped.

A flag needs to be added to the lock module interface so that the lock module can tell GFS whether or not the lock was dropped during a promotion. GFS can then use this flag to determine whether or not to invalidate its cache.

gfs_trans_add_i( ) to reduce calling of endianess conversion routines.

To add and inode to a transaction, you add the dinodes disk buffer to the transaction. Since the transaction code only knows about buffers, and not about the fields in "gfs_inode_t->i_di", there are many more calls to gfs_dinode_out( ) than are necessary. (gfs_dinode_out( ) copies data from the "gfs_inode t->i_di" structure into dinode buffers.)

Allowing the file system 100 to understand "adding gfs_inode_t" structures to transactions would allow gfs_dinode_out( ) to be called only once per transaction.

Switch transaction lock to deferred on recovery.

GFS' transaction lock is there to prevent machines from committing new transactions to their locks while a log replay is in progress. When processes build transactions, they acquire the lock in a shared state. Currently, when a process goes to replay a journal, it acquires the transaction lock in the exclusive state. This does stop new transactions from happening, but it also means that only one journal can be replayed at a time.

Recovery processes need to start acquiring the transaction lock in the deferred state. This still causes all new transactions to be blocked, but it allows multiple holders (and multiple journal replays). In the preferred embodiment this is done on a per-block locking in the filesystem to prevent problems during replay.

Replaying each block in a journal is a read-modify-write operation. The inplace block needs to be read in, its generation number compared against that of the log block, and (optionally) the log block overwrites the inplace block. If that block isn't locked during this operation, two competing recovery process can cause problems.

File versioning in the filesystem

The present invention can also support the versioning of files in the filesystem. This basically amounts to a snapshotting at a file-by-file granularity.

Metadata callouts

Every change to the filesystem generates and event that can be logged into a database external to GFS. That database can then be queried. This is really useful at backup time because the whole (possibly very huge) file tree structure doesn't need to be scanned. Customers have asked for this repeatedly.

In the foregoing description, for purposes of explanation, numerous specific details have been set forth in order to provide a thorough understanding of the present invention. It is important to understand that the present invention may be practiced with some or all of these specific details. Those skilled in the art will recognize modifications and alterations upon a reading and understanding of this specification. The present invention is intended to include all such modifications and alterations insofar as they come within the scope of the appended claims or the equivalents thereof.

We claim:

1. A distributed file system comprising:
a plurality of storage devices configured to store files;
a plurality of disk servers, coupled to the plurality of storage devices, executing as a single disk server layer and configured to organize the plurality of storage devices based on a single address space;
a plurality of lock servers, coupled to the disk server layer, cooperatively executing as a single distributed lock server and configured to coordinate access to the files stored on the plurality of physical disks based on locks;
a plurality of file servers comprising file server memories, and coupled to the plurality of lock servers and the disk server layer, executing as a single distributed file server layer and configured to retrieve requested files from the plurality of disk servers based on locks issued by the plurality of lock servers; and
a management node, wherein the management node is configured to execute a management framework, framework plugins, and standalone programs/utilities related to management;
wherein in the response to a request for a file from a user program from one file server of the plurality of file servers, the single distributed file server layer
is configured to retrieve the requested file from at least one of the storage devices and at least one lock, associated with the retrieved file, from at least one lock server; and
to retrieve meta-data for at least one file that is related to the requested files, and at least one lock, for each file that has had its meta-data retrieved, the at least one lock and meta-data being stored in a memory of the one file server.

2. The system of claim 1, wherein the management node is coupled to at least one of the plurality of file servers via a proxy.

3. The system of claim 1, wherein the management node is coupled to at least one of the plurality of file servers via a daemon running on a host of the at least one file server.

4. The system of claim 1, wherein the management node is configured to discover file servers in the file server layer.

5. A file system distributed over a plurality of computers connected by a network, the plurality of computers executing user programs, and the user programs accessing files stored on one or more physical disks connected to the plurality of computers, comprising:
- a plurality of disk servers operating as a single distributed disk server layer and connected to the one or more physical disks, each disk server storing meta-data for each of the files stored on the one or more disks;
- a plurality of lock servers, having at least one or more read locks and one or more write locks for each file stored on the one or more physical disks, said lock servers operating as a single distributed lock server to coordinate access to the files stored by the disk server layer;
- a plurality of asynchronous file servers, each having a memory, operating as a single distributed file server layer so that in response to a request for a file from a user program; and
- a management node, wherein the management node is configured to execute a management framework, framework plugins, and standalone programs/utilities related to management;

the single distributed file layer;
- wherein, the distributed file system layer is configured to retrieve the requested file from the disk server layer and at least one lock, associated with the retrieved file, from the lock server in response to a request for a file from a user program; and
- is configured to retrieve meta-data for at least one file that is related to the requested files, and at least one lock, for each file that has had its meta-data retrieved, the at least one lock and meta-data being stored in the file server memory.

6. A file system distributed over a plurality of computers connected by a network, the plurality of computers executing user programs, and the user programs accessing files stored on one or more physical disks connected to the plurality of computers, comprising
- accessible storage connecting the plurality of computers to the one or more physical disks;
- a plurality of lock servers, having at least one or more read locks and one or more write locks for each file stored on the one or more physical disks, said lock servers operating as a single distributed lock server to coordinate access to the files stored on the disks;
- a plurality of asynchronous file servers, each having a memory, operating as a single distributed file server layer so that in the response to a request for a file from a user program, the single distributed file server layer
- is configured to retrieve the requested file from the disk via the accessible storage and at least one lock, associated with the retrieved file, from the lock server, and
- to retrieve meta-data for at least one file that is related to the requested files, and at least one lock, for each file that has had its meta-data retrieved, the at least one lock and meta-data being stored in the file server memory; and
- a management node, wherein the management node is configured to execute a management framework, framework plugins, and standalone programs/utilities related to management.

\* \* \* \* \*